United States Patent
Lin et al.

(10) Patent No.: US 10,484,738 B2
(45) Date of Patent: Nov. 19, 2019

(54) TELEVISION AND METHOD FOR FILTERING TELEVISION PROGRAM CONTENT

(71) Applicant: HON HAI PRECISION INDUSTRY CO., LTD., New Taipei (TW)

(72) Inventors: Jung-Yi Lin, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/997,882

(22) Filed: Jun. 5, 2018

(65) Prior Publication Data

US 2019/0320228 A1    Oct. 17, 2019

(30) Foreign Application Priority Data

Apr. 17, 2018    (CN) .......................... 2018 1 0345186

(51) Int. Cl.
| G06K 9/00 | (2006.01) |
| H04N 21/454 | (2011.01) |
| H04N 21/4545 | (2011.01) |
| G06N 20/00 | (2019.01) |

(52) U.S. Cl.
CPC ..... *H04N 21/4542* (2013.01); *G06K 9/00718* (2013.01); *G06N 20/00* (2019.01); *H04N 21/45457* (2013.01)

(58) Field of Classification Search
CPC .. H04N 21/84; H04N 21/4312; H04N 19/136; H04N 21/23418; H04N 2201/325; H04N 21/4542; H04N 21/45457; G06K 9/00771; G06K 9/00711; G06K 9/00744; G06K 9/00718; G06N 20/00
USPC .......................................................... 725/32
See application file for complete search history.

(56) References Cited

U.S. PATENT DOCUMENTS

| 2003/0086691 A1* | 5/2003 | Yu .......................... G11B 27/007 |
| | | 386/241 |
| 2007/0003217 A1* | 1/2007 | Jang ....................... H04H 60/27 |
| | | 386/214 |
| 2014/0310586 A1* | 10/2014 | Lewis .................... G06F 17/241 |
| | | 715/232 |
| 2016/0044357 A1 | 2/2016 | Wang |
| 2017/0006338 A1 | 1/2017 | Kim et al. |
| 2018/0232592 A1* | 8/2018 | Stewart ............ G08B 13/19606 |

* cited by examiner

*Primary Examiner* — Cynthia M Fogg
(74) *Attorney, Agent, or Firm* — ScienBiziP, P.C.

(57) ABSTRACT

A method for filtering a television program includes capturing preview content of a television program, analyzing the preview content to generate a specific image model, determining, when the television program is displayed, whether the specific image model is displayed in the television program, and prompting a user to take a specific action when the specific image model is displayed in the television program. The preview content is captured within a preset time duration before the television program is displayed on the television.

12 Claims, 3 Drawing Sheets

TELEVISION AND METHOD FOR FILTERING TELEVISION PROGRAM CONTENT

FIELD

The subject matter herein generally relates to television programs, and more particularly to a television and method for filtering out content of a television program.

BACKGROUND

Generally, there is no way to know the contents of a television program without first watching it. Some contents of television programs are not suitable for some viewers to watch, and so a way to filter out content of the television program is required.

BRIEF DESCRIPTION OF THE DRAWINGS

Implementations of the present disclosure will now be described, by way of example only, with reference to the attached figures.

DETAILED DESCRIPTION

Figure 1:
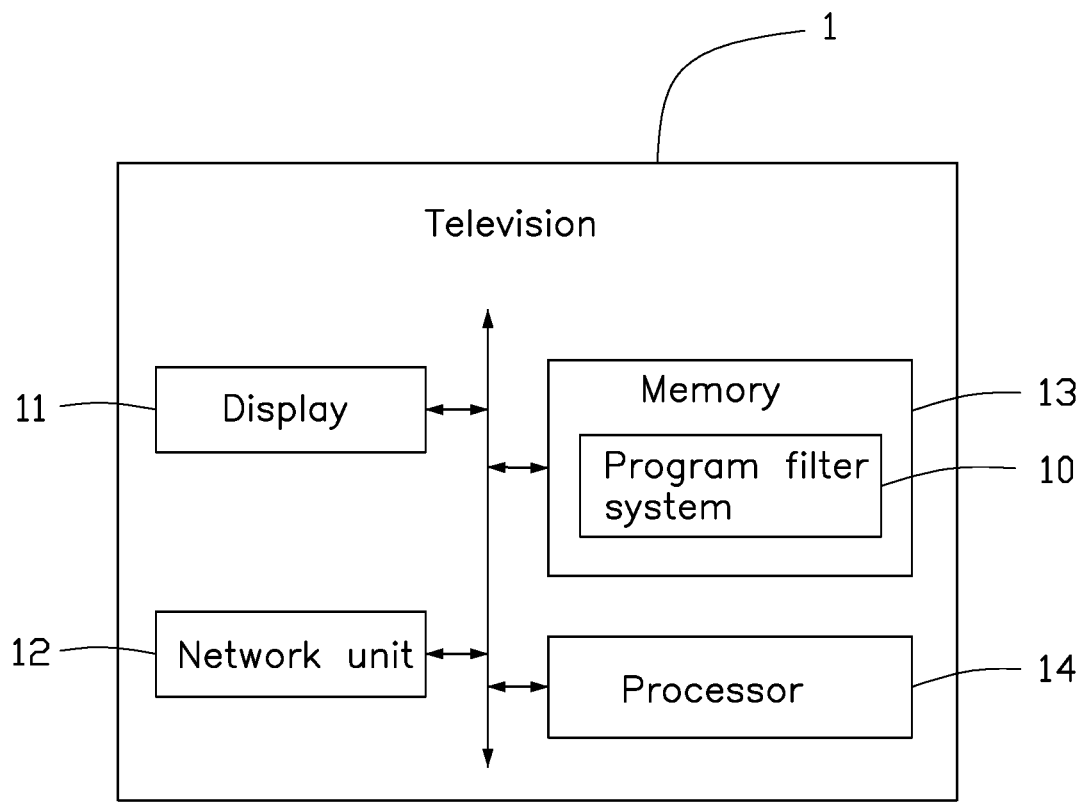
FIG. 1 is a block diagram of an embodiment of a television.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of a television program filter system 10 implemented in a television 1. The television 1 includes, but is not limited to, a display 11, a network unit 12, a memory 13, and a processor 14. The display 11, the network unit 12, the memory 13, and the processor 14 are electrically coupled to each other.

The display 11 may be a touch display, such as a liquid crystal display or an organic light-emitting diode display. The display 11 displays television programs of the television 1.

The network unit 12 provides a wired or wireless network for the television 1. The wired network may be the Internet or a local area network, for example. The wireless network may be GPRS, Wi-Fi/WLAN, CDMA2000/WCDMA/TD-SCDMA, or LTE, for example.

In at least one embodiment, the memory 13 stores software instructions and a plurality of data of the television 1. The memory 13 may be an internal memory of the television 1, such as a hard disk. In another embodiment, the memory 13 may be an external memory of the television 1, such as a smart media card, a secure digital card, a flash card, or the like. The memory 13 may be a non-transitory storage medium for storing the television program filter system 10. The television program filter system 10 captures preview content of a television program when a user changes a channel and analyzes the captured preview content to generate a specific image model. When the specific image model is displayed in the television program when the user watches the television program, the specific image model is filtered out of the television program.

In at least one embodiment, the processor 14 may be a central processor, a microprocessor, or other data processing chip.

Figure 2:
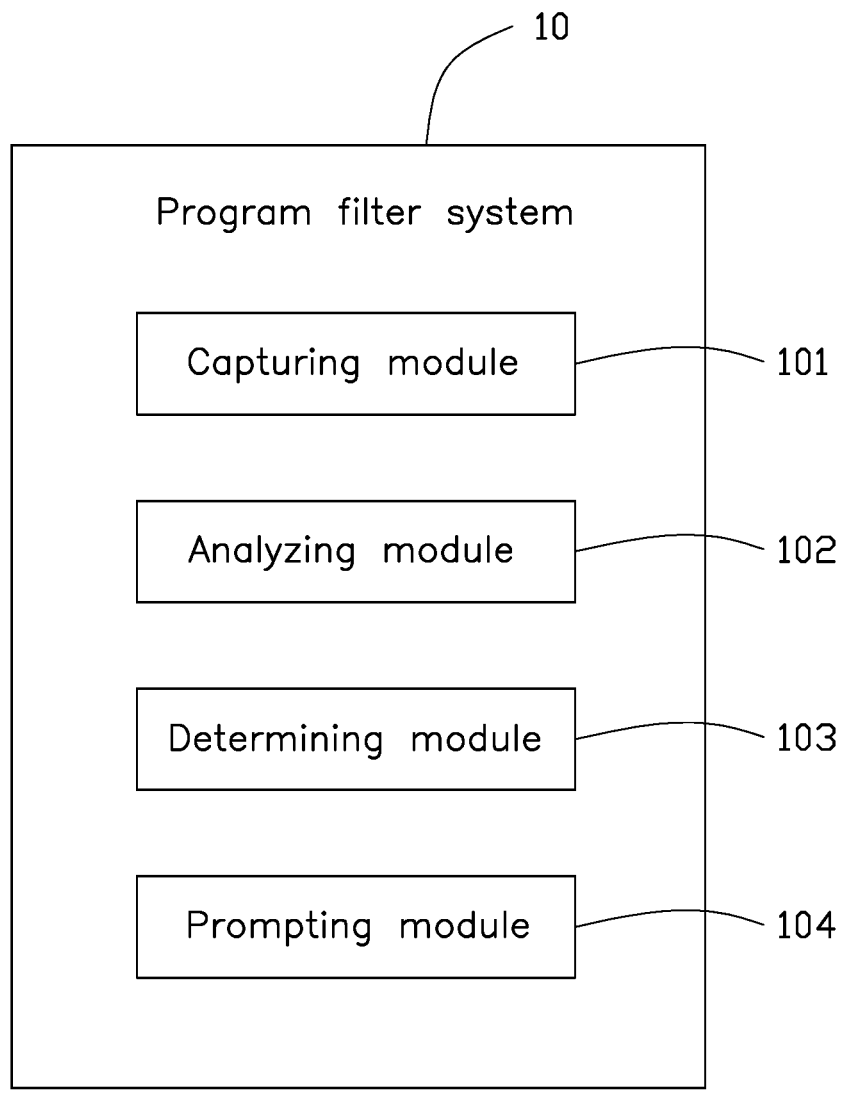
FIG. 2 is a block diagram of a program filter system implemented in the television in FIG. 1.

Referring to FIG. 2, the television program filter system 10 may be divided into a plurality of modules stored in the memory 13 and executed by the processor 14. The television program filter system 10 may include a capturing module 101, an analyzing module 102, a determining module 103, and a prompting module 104.

Figure 3:
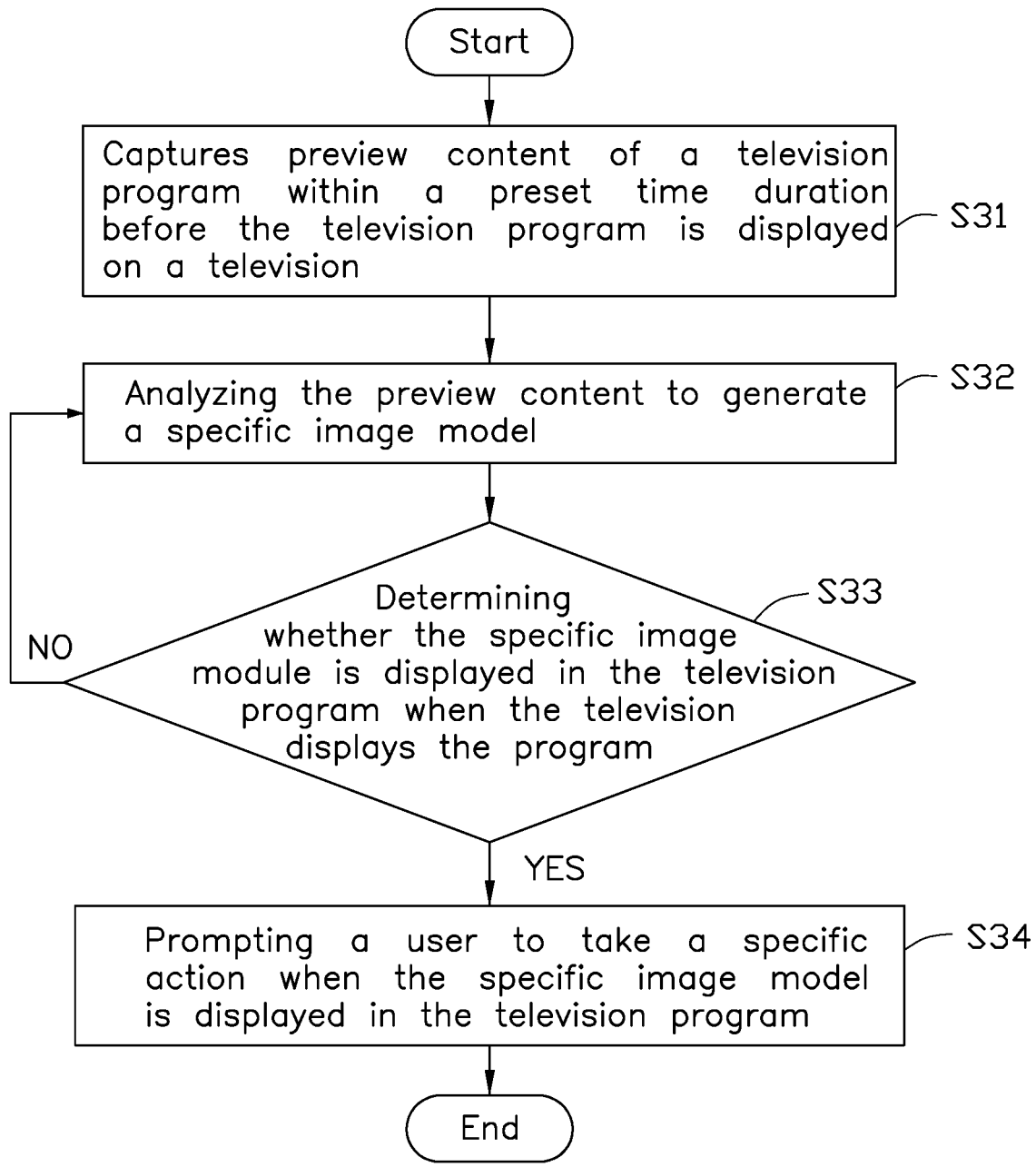
FIG. 3 is flow chart of a method for filtering content of a television program.

FIG. 3 illustrates a flowchart of an exemplary method for filtering television programs. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S31.

At block S31, the capturing module 101 captures preview content of a television program within a preset time duration before the television program is displayed on the television.

In at least one embodiment, the television 1 may communicate with a remote control (not shown) through the communication unit 12. A user may change the channel with the remote control. When the television 1 receives a control to change the channel, the capturing module 101 records a time of changing the channel and captures the preview content within the preset/adjustable time duration before the recorded time of changing the channel. For example, if the time of changing the channel is T and the preset time duration is T1, then the capturing module 101 captures the preview content from T-T1 to T. For example, if T1 is equal to three seconds, then the capturing module 101 captures the preview content from within three seconds of changing the channel.

At block S32, the analyzing module 102 analyzes the preview content captured by the capturing module 101 to generate the specific image model.

In at least one embodiment, the analyzing module 102 utilizes a machine learning algorithm to analyze the preview content to generate the specific image model. The analyzing module 102 analyzes one or more frames of the preview content and groups similar frames together into a group to generate the specific image model.

In at least one embodiment, the analyzing module 102 further names the specific image model. For example, when the preview content contains bloody images, the analyzing module 102 groups the similar frames together into a group to generate the specific image model and then names the specific image model as "bloody images". In another embodiment, the analyzing module 102 does not have to name the specific image model.

At block S33, when the television 1 displays the television program, the determining module 103 determines whether the specific image module is displayed in the television program.

In at least one embodiment, the determining module 103 determines whether the specific image model is displayed in the television program by comparing contents of the television program to the specific image model and determining that a similarity of the contents of the television program to the specific image model is greater than or equal to a preset/adjustable value. When the similarity of the contents of the television program to the specific image model is greater than or equal to the preset/adjustable value, block S34 is implemented. Otherwise, when the similarity of the contents of the television program to the specific image model is less than the preset/adjustable value, block S31 is implemented.

At block S34, when the specific image model is displayed in the television program, the prompting module 104 prompts the user to take a specific action.

In at least one embodiment, the prompting module 104 provides a user interface on the display 11 to let the user choose a specific action to take. The specific action may include, for example, changing the channel or turning off the television 1. When the contents of the television program have a similarity to the specific image model greater than or equal to the preset/adjustable value, the television program may not be suitable for the user to view or the user may not like the television program, and so the contents of the television program are filtered out.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A non-transitory storage medium having stored thereon instructions that, when executed by at least one processor of a television, causes the at least one processor to execute the instructions of a method for filtering a television program, the method comprising:
    capturing preview content of a television program within a preset time duration before the television program is displayed on the television;
    analyzing the preview content to generate a specific image model;
    determining, when the television program is displayed, whether the specific image model is displayed in the television program; and
    prompting a user to take a specific action when the specific image model is displayed in the television program.

2. The non-transitory storage medium of claim 1, wherein the specific image model is determined to be displayed in the television program by comparing contents of the television program to the specific image model and determining that a similarity of the contents of the television program to the specific image model is greater than or equal to a preset value.

3. The non-transitory storage medium of claim 1, wherein the specific image model is generated by analyzing one or more frames of the preview content within the preset time duration and grouping similar frames together into a group to generate the specific image model.

4. The non-transitory storage medium of claim 3, wherein the preview content is analyzed by a machine learning algorithm.

5. A method for filtering a television program, the method comprising:
    capturing preview content of a television program within a preset time duration before the television program is displayed on the television;
    analyzing the preview content to generate a specific image model;
    determining, when the television program is displayed, whether the specific image model is displayed in the television program; and
    prompting a user to take a specific action when the specific image model is displayed in the television program.

6. The method of claim 5, wherein the specific image model is determined to be displayed in the television program by comparing contents of the television program to the specific image model and determining that a similarity of the contents of the television program to the specific image model is greater than or equal to a preset value.

7. The method of claim 5, wherein the specific image model is generated by analyzing one or more frames of the preview content within the preset time duration and grouping similar frames together into a group to generate the specific image model.

8. The method of claim 7, wherein the preview content is analyzed by a machine learning algorithm.

9. A television comprising a display and a processor, the processor configured to:
    capture preview content of a television program within a preset time duration before the television program is displayed on the television;
    analyze the preview content to generate a specific image model;

determine, when the television program is displayed, whether the specific image model is displayed in the television program; and prompt a user to take a specific action when the specific image model is displayed in the television program.

10. The television of claim 9, wherein the specific image model is determined to be displayed in the television program by comparing contents of the television program to the specific image model and determining that a similarity of the contents of the television program to the specific image model is greater than or equal to a preset value.

11. The television of claim 9, wherein the specific image model is generated by analyzing one or more frames of the preview content within the preset time duration and grouping similar frames together into a group to generate the specific image model.

12. The television of claim 11, wherein the preview content is analyzed by a machine learning algorithm.

* * * * *